United States Patent
Kojima

(10) Patent No.: US 9,221,503 B2
(45) Date of Patent: Dec. 29, 2015

(54) FRONT SPOILER DEVICE

(71) Applicant: Nissan Motor Co., Ltd, Kanagawa (JP)

(72) Inventor: Shunpei Kojima, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/414,258

(22) PCT Filed: Jun. 19, 2013

(86) PCT No.: PCT/JP2013/066781
§ 371 (c)(1),
(2) Date: Jan. 12, 2015

(87) PCT Pub. No.: WO2014/010379
PCT Pub. Date: Jan. 16, 2014

(65) Prior Publication Data
US 2015/0210324 A1    Jul. 30, 2015

(30) Foreign Application Priority Data

Jul. 13, 2012   (JP) .................................. 2012-157294

(51) Int. Cl.
| | | |
|---|---|---|
| B62D 35/00 | (2006.01) | |
| B62D 35/02 | (2006.01) | |
| B60R 19/02 | (2006.01) | |
| B62D 27/02 | (2006.01) | |

(52) U.S. Cl.
CPC ............ *B62D 35/005* (2013.01); *B60R 19/023* (2013.01); *B62D 35/02* (2013.01); *B62D 27/023* (2013.01)

(58) Field of Classification Search
CPC .... B60R 19/02; B60R 19/023; B62D 35/005; B62D 35/02
USPC .................. 296/180.1, 180.2, 181.2, 181.5; 293/112
See application file for complete search history.

(56) References Cited

FOREIGN PATENT DOCUMENTS

| | | | |
|---|---|---|---|
| JP | 63-108874 | U | 7/1988 |
| JP | 63207776 | A * | 8/1988 |
| JP | 2003-13918 | A | 1/2003 |
| JP | 2005-88827 | A | 4/2005 |
| JP | 3696528 | B2 | 7/2005 |
| JP | 2006-27561 | A | 2/2006 |
| JP | 2009-227159 | A | 10/2009 |
| JP | 2011-131679 | A | 7/2011 |

OTHER PUBLICATIONS

International Search Report for corresponding International Application No. PCT/JP2013/066781, mailed Jul. 30, 2013 (4 pages).

* cited by examiner

*Primary Examiner* — Jason S Daniels
(74) *Attorney, Agent, or Firm* — Osha Liang LLP

(57) ABSTRACT

A front spoiler device configured to be installed on a vehicle having a vehicle width direction, a vehicle upward direction, a vehicle downward direction, a vehicle forward direction, and vehicle rearward direction, has a front bumper, a bumper fascia that forms an outer surface of the front bumper, a spoiler supporting flange portion extending in the vehicle rearward direction from a lower end of the bumper fascia, a spoiler body extending along the lower end of the bumper fascia in the vehicle width direction, the spoiler body being provided with a vertical wall portion facing the vehicle forward direction, and two diffuser portions, each of which is connected to each lateral end of the spoiler body, each of which extends in the vehicle downward direction and in the vehicle width direction along a corner portion of each lateral end on the lower end of the bumper fascia.

5 Claims, 6 Drawing Sheets

FRONT SPOILER DEVICE

CROSS-REFERENCE TO RELATED APPLICATION

This application is a national stage application of PCT/JP2013/066781 filed Jun. 19, 2013, and claims priority to Japanese patent application No. 2012-157294, which was filed with Japan Patent Office on Jul. 13, 2012, the entire disclosure of which is hereby incorporated by reference herein in its entirety.

BACKGROUND

1. Technical Field

The present invention relates to a front spoiler device extending the lower end of a front bumper downwardly from a vehicle body.

2. Related Art

Conventionally, a front spoiler device attached to the lower end of a front bumper is known (for example, see Patent Document 1).

In the conventional front spoiler device, although the lower end of the front bumper is extended downwardly, it is more preferable from the perspective of aerodynamic characteristics that the front bumper extends in a vehicle width direction to a position that covers a front wheel so that corner portions of the lower end of the front bumper in the vehicle width direction are extended in both the vehicle downward direction and the vehicle width direction.

However, when providing on the front spoiler device a portion extending from the front bumper lower end laterally, in order to integrally form the overall front spoiler device, it is difficult to perform dimensional control of the front bumper and the spoiler device. Therefore, in the prior art described in Patent Document 1, by dividing a front spoiler device at the lateral center position in the vehicle width direction into two parts and coupling both parts to be relatively movable in the vehicle width direction so that the dimensional errors in the lateral or vehicle width direction may be absorbed.

Patent Document 1: JP Patent No. 3,696,528

SUMMARY

However, in the conventional technique, due to the central partition or division of the front spoiler device at the vehicle center, a partition line appears, in which the end faces of both parts are opposed to each other. Also, depending on the size of the gap that occurs in the divided parts according to the dimensional errors, deterioration of the quality of appearance will arise.

One or more embodiments of the present invention provides a front spoiler device with excellent aerodynamics by extending both lateral ends of the front bumper lower end portion in the vehicle width direction without reducing the appearance quality.

One or more embodiments of the present invention comprises a diffuser portion with a rectifier or baffle plate portion that faces the front of the vehicle, the diffuser portion being connected to each of both lateral end portions of the spoiler body and extends along a corner portion of a bumper fascia in the vehicle downward direction and in the vehicle width direction, and an insertion space forming portion provided in the diffuser portion for forming an insertion space into which at least the lateral end of the vertical wall portion of the spoiler body may be inserted in the vehicle width direction and for forming an annular shape with the baffle plate portion.

In a front spoiler device according to one or more embodiments of the present invention, a diffuser portion with a baffle plate portion is provided on both lateral ends of the spoiler body, which extends in the vehicle downward direction and in the vehicle width direction along a corner portion of a bumper fascia. Thus, in the front spoiler device according to one or more embodiments of the present invention, as compared with those which do not have the diffuser portion, aerodynamic performance is improved. In addition, at opposite ends of the spoiler body in the vehicle width direction, such a structure is adopted in which the end portion of the baffle plate is able to be inserted into an insertion space of the diffuser portion. Thus, the partition line generated between the spoiler body and the diffuser portion will be located in the opposite ends of the front spoiler device and the appearance quality is improved, as compared with the device in which the dividing line is generated in the center of the vehicle width direction. Moreover, in the position of this partition line, each of the opposite ends of the vertical wall portion is inserted into an insertion or plug-in space formed with the diffuser portion without both end faces of these parts being opposed to each other. Therefore, the dividing line is less noticeable, so that, in this respect as well, it is possible to obtain a high quality appearance.

Thus, in one or more embodiments of the present invention, it is possible to provide a front spoiler device having excellent aerodynamics without reducing the appearance quality, by extending the lateral ends of the lower end portion of a front bumper in the vehicle width direction.

In addition, since the diffuser portion is provided with an insertion space forming portion that annually surrounds an insertion space in the center of vehicle width direction, as compared with the structure without the annular shape, it is possible to ensure the rigidity of the connecting portion to the spoiler body, thereby suppressing damage.

DETAILED DESCRIPTION

Embodiments of the present invention will now be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
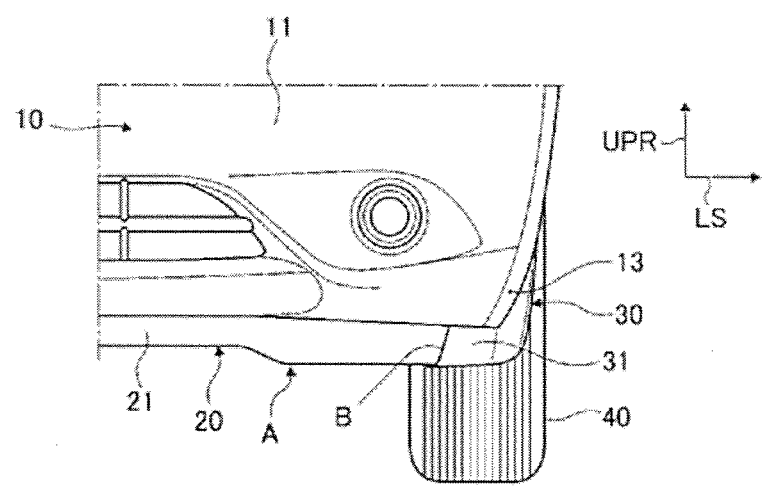
FIG. 1 is a front view showing a main part of the vehicle front portion to which a front spoiler device according to one or more embodiments of the present invention is applied.

A front spoiler device A according to one or more embodiments of the present invention will be described with reference to FIGS. 1 to 7. FIG. 1 is a front view seen from a vehicle front direction showing a vehicle left part (Arrow LS indicates the vehicle left in the figure, and an arrow UPR indicates an upper side of the vehicle) of the front end lower portion of a vehicle to which the front spoiler device A according to one or more embodiments of the present invention is applied.

The front end lower portion of the vehicle is provided with a front bumper 10. To the front bumper 10, a bumper fascia 11 made of synthetic resin is attached on the vehicle front side of a reinforcement of metal (not shown).

Figure 2:
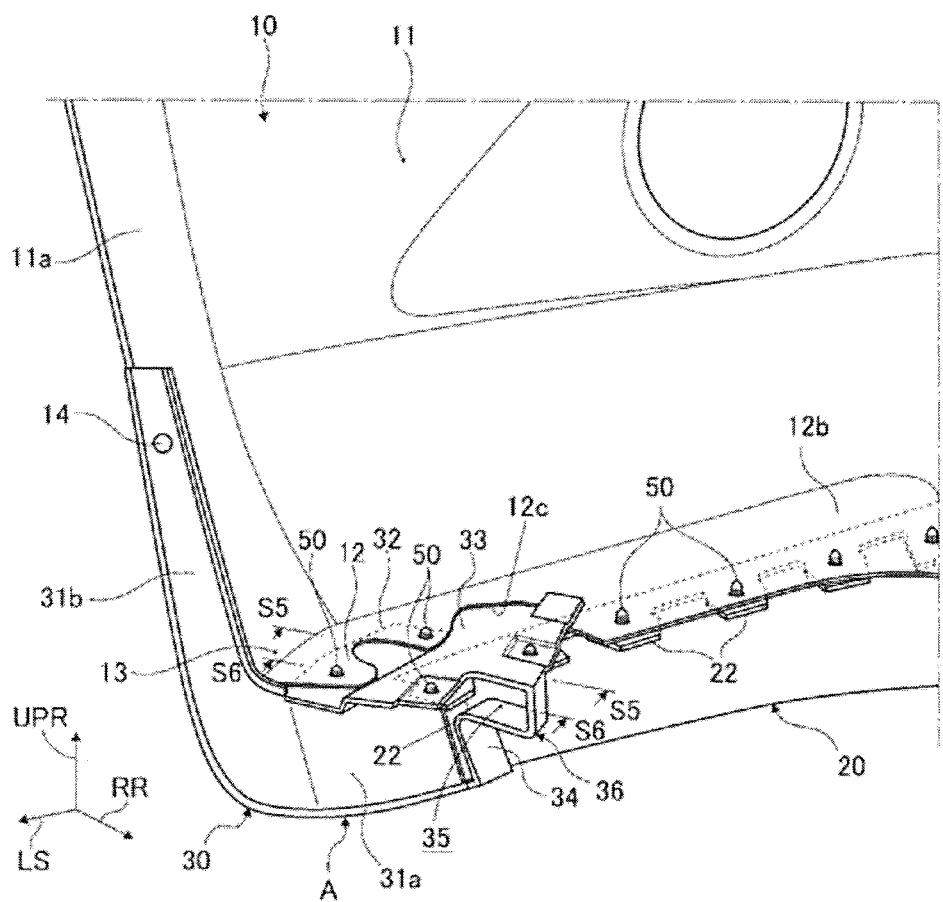
FIG. 2 is a perspective view showing the main part of the front spoiler device according to one or more embodiments of the present invention in a state looking down a vehicle lateral end portion of the rear face of the bumper fascia from diagonally upward and rearward position.

FIG. 2 is a perspective view of the rear side of the bumper fascia 11 viewed from a vehicle diagonally upward and rearward position (Arrow RR indicates the rear of the vehicle). As shown in this figure, the bumper fascia 11 is shaped to form a gently curve in the horizontal direction so that the center portion thereof in the vehicle width direction is positioned most ahead in the vehicle front and generally retracts in the vehicle rearward direction toward both ends of the bumper fascia. In addition, the lower end of the bumper fascia 11 is provided with a spoiler supporting flange portion 12 which extends substantially horizontally in the rear of the vehicle.

The spoiler supporting flange portion 12 is formed with screw holes (the screw holes being omitted for illustration by way of illustration of the screws 50 in FIG. 2) at predetermined intervals for fastening screws 50 to be described below. In addition, the portion at the location in the outermost in the vehicle width direction formed with two screw holes is intended to be used for supporting a diffuser portion 30 to be described below and is referred to as a diffuser supporting portion 12b.

Furthermore, in the spoiler supporting flange portion 12, between the diffuser supporting portion 12b and the other part, a notch 12c which is cut out in the front of the vehicle is provided, which is formed in a shape to cut the continuity of the spoiler supporting flange portion 12.

As shown in FIG. 1, the front spoiler device A of one or more embodiments of the present invention is provided at the lower end portion of a bumper fascia 11 of the front bumper 10, and extends along corners of both vehicle lateral ends thereof.

The front spoiler device A is provided with a spoiler body 20 described above and a diffuser portion 30.

Figure 3:
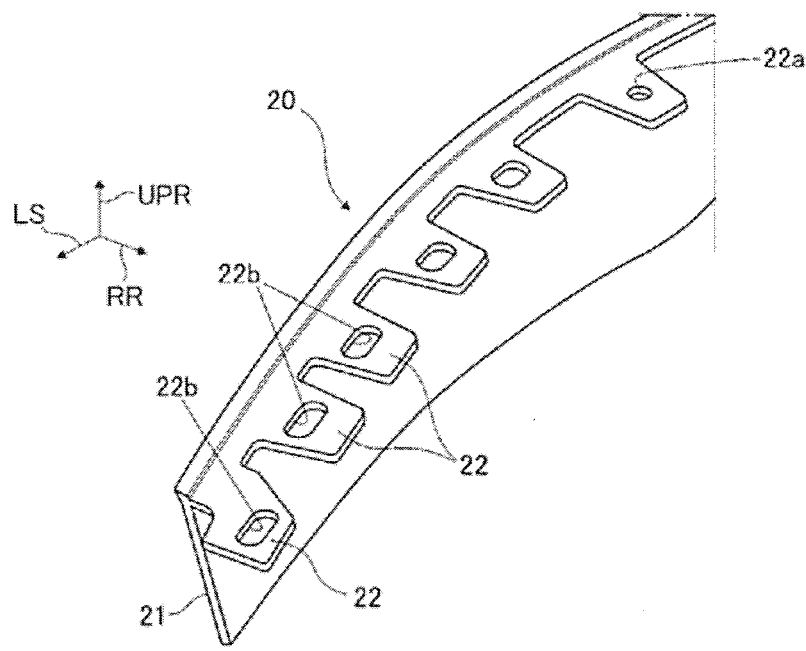
FIG. 3 is a perspective view showing the spoiler body of the front spoiler device according to one or more embodiments of the present invention.

The spoiler body 20 is attached along the bottom edge or lower end of the bumper fascia 11 of the front bumper 10. Therefore, the spoiler body 20, like the bumper fascia 11, is shaped in a curve in a horizontal direction, as shown in FIG. 3 as well in such a manner in which the spoiler body is located rearward as the distance from the center increases towards both ends in the vehicle width direction. Note that the spoiler body 20 is dimensioned in a length slightly shorter than the entire length of the bumper fascia 11 of the front bumper 10 in the vehicle width direction so as to extend to a position overlapping with the front wheel 40 in the vehicle width direction, as shown in FIG. 1.

In addition, as shown in FIG. 3, the spoiler body 20 is formed integrally with the vertical wall portion 21 and the mounting flange portion 22.

The vertical wall portion 21 formed in a thin plate extends along the lower end portion of the bumper fascia 11 in the vehicle width direction and extends downward of the vehicle from the lower end of the bumper fascia 11 with its front and back surfaces facing the longitudinal direction of the vehicle.

The mounting flange portion 22 is formed into a thin plate which is extended rearward from the upper end of the vertical wall portion 21. In addition, as shown in FIG. 2, the mounting flange portion 22 is fastened to the spoiler supporting flange portion 12 of the bumper fascia 11 by a fastening member such as a screw 50 in the overlapping state on the lower surface thereof. Therefore, the mounting flange portion 22 is formed with fastening holes 22a, 22b for the screw 50 to be inserted therethrough. With respect to these fastening holes 22a, 22b, the fastening hole 22a located in the center of the vehicle width direction of the spoiler body 20 is formed in a circular shape the inner diameter of which is the same as the outer diameter of the screw 50. On the other hand, the fastening hole 22b located outside of the vehicle width center is formed in an elongated shape with a larger size in the vehicle width direction so as to absorb the dimensional errors with respect to the bumper fascia 11 or the diffuser portion 30 during fastening operation.

Figure 4:
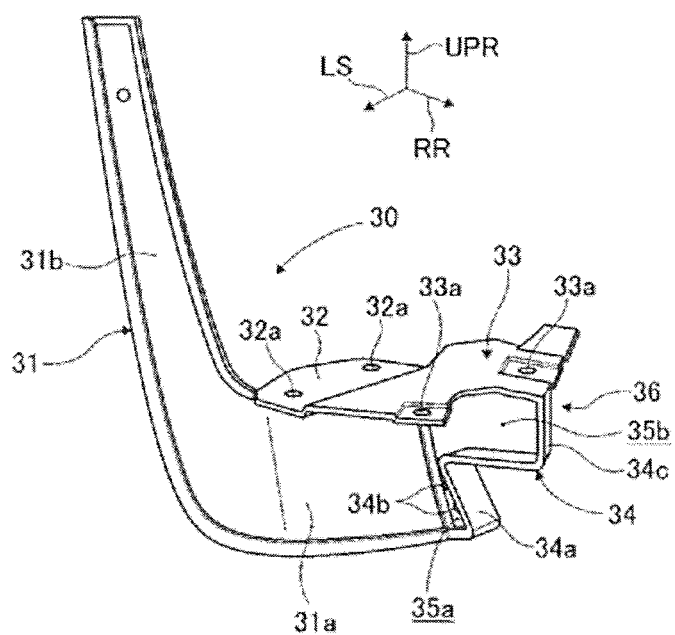
FIG. 4 is a perspective view showing a diffuser portion of the front spoiler device according to one or more embodiments of the present invention.

As shown in FIG. 1, the diffuser portion 30 is provided along the corner portion 13 in the vehicle width direction end portions of the lower end of the bumper fascia 11. Therefore, the diffuser portion 30, like the bumper fascia 11, is shaped in a curve in a horizontal direction, as shown in FIG. 4 as well, in such a manner in which the diffuser portion is located rearward as the distance from the center increases towards both ends in the vehicle width direction.

Also, the diffuser portion 30 is formed in an integral unit of a baffle or rectifier plate 31, a front (side) mounting flange portion 32, a rear (side) connecting flange portion 33, and a connecting portion 34.

The baffle plate portion 31 is formed in a plate facing in the longitudinal direction of the vehicle and has a substantially L-shape as viewed in the vehicle longitudinal direction. The baffle plate is further provided with a lower extending portion 31a that extends in the vehicle downward direction from the corner portion 13 of the bumper fascia 11 and in the vehicle width direction extending portion 31b that extends in the vehicle width direction from the corner portion 13.

It should be noted, the vehicle width direction extending portion 31b is in contact with the rear surface 11a of the bumper fascia 11 and extends to the outside of the part in the vehicle width direction, that does not overlap with the bumper fascia 11 in the vehicle width direction. Further, the upper end portion of the vehicle width direction extending portion 31b is engaged with a screw 14 which protrudes from the rear surface 11a of the bumper fascia 11.

Figure 5:
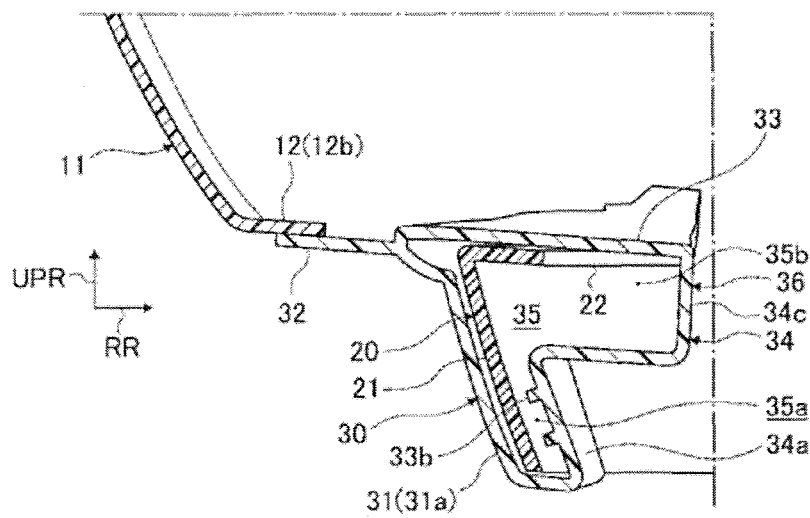
FIG. 5 is a cross-sectional view showing a main part of the front spoiler device according to one or more embodiments of the present invention illustrating a cross section taken along the line S5-S5 in FIG. 2.
Figure 6:
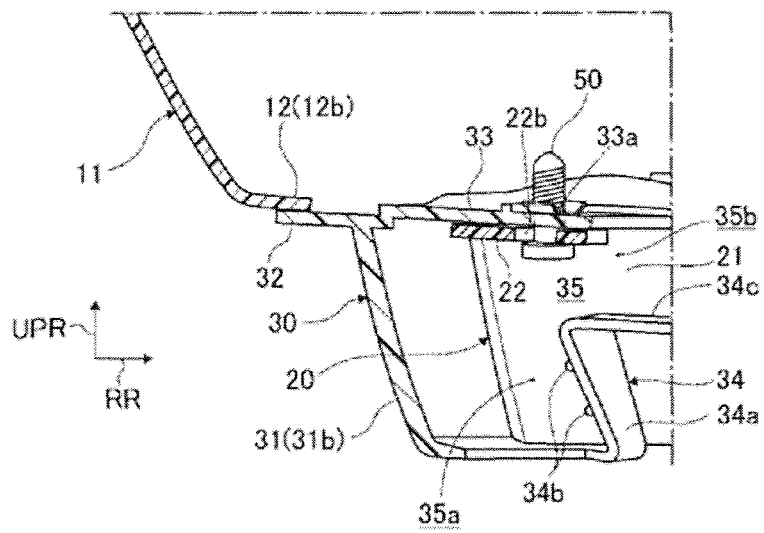
FIG. 6 is a cross-sectional view showing a main part of the front spoiler device according to one or more embodiments of the present invention illustrating a cross section taken along the line S6-S6 in FIG. 2.
Figure 7:
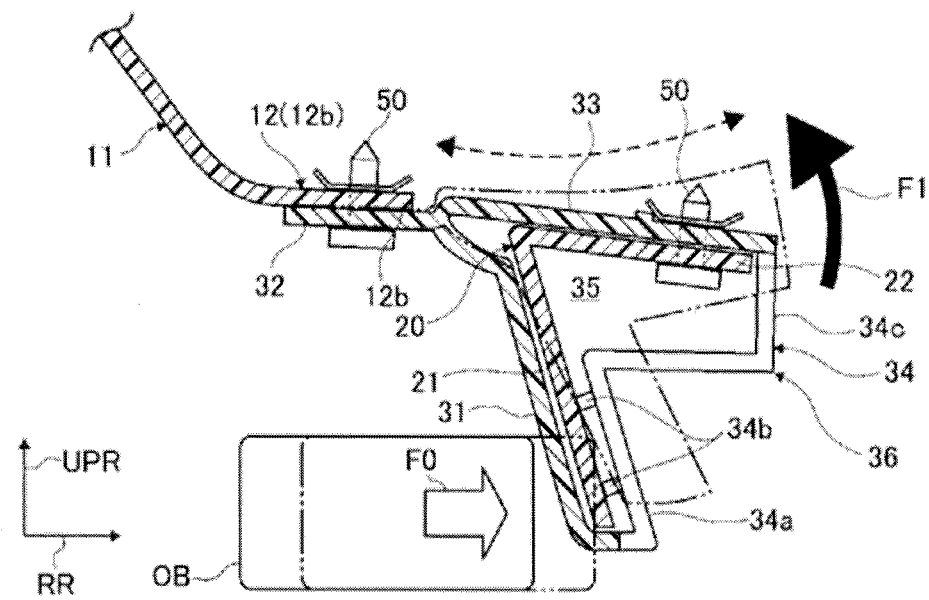
FIG. 7 illustrates the operation of the front spoiler device according to one or more embodiments of the present invention.

As shown in FIGS. 5-7, the front mounting flange 32 extends toward the front of the vehicle from the upper end of the lower extending portion 31a in 31 of the baffle plate, and is fastened by a screw 50 to the diffuser supporting portion 12b of the bumper fascia 11 while overlapping the lower surface of the diffuser supporting portion 12b. Note, as shown in FIG. 4, the front mounting flange 32 is provided with screw holes 32a for the screw 50 to be inserted. This screw holes 32a merely serve to match the positions of the two screw holes on the side of the bumper fascia 11 so that the inner diameter thereof is formed within a generally acceptable degree of tolerance due to a small error in dimension.

As shown in FIGS. 5-7, the rear connecting flange portion 33 extends rearward from the upper end of the lower extending portion 31a of the baffle plate portion 31, and, as shown in FIG. 2, is fastened to the mounting flange portion 22 of the spoiler body 20 by the screw 50 while being superimposed on the upper surface thereof. Also, in the rear connecting flange portion 33, two screw holes 33a are formed. The screw holes 33a are formed in a circular shape with a suitable diameter for insertion of a screw 50.

As shown in FIG. 5, the connecting portion 34 is formed in a thin plate shape and connects the rear end portion of the rear connecting flange portion 33 and the end of the rear of the baffle plate portion 31 facing the vehicle rear side at the center of the baffle plate portion 31 in the vehicle width direction. Thus, by the connecting portion 34, the baffle plate portion 31, and the rear connecting flange portion 33, an annular insertion space forming portion 36 is formed, and surrounded by this insertion space forming portion 36, an insertion space 35 is formed for insertion of the lateral ends of the spoiler body 20.

Also, the bottom 34a of the connecting portion 34 extends in the vertical direction of the vehicle at an interval substantially constant with respect to the baffle plate portion 31, and in the lower end portion of the insertion space 35, a vertical wall insertion space 35a sandwiched between the baffle plate 31 and the connecting portion 34 in the back and forth direction.

In the surface of the bottom 34a on the vehicle front side, as shown in FIG. 7, two ribs 34b are provided vertically spaced from each other in contact with or adjacent to the rear surface of the vertical wall portion 21 which is inserted into the vertical wall insertion space 35a.

Also, the top 34c of the connecting portion 34 extends rearward of the vehicle from the bottom 34a and is further bent in a vehicle upward direction to form the cross section of substantially L to thereby form a flange insertion space 35b into which the mounting flange portion 22 of the spoiler body 20 may be inserted.

Now, a description is given of the operation of one or more embodiments of the present invention.
(Connecting Work)

The front spoiler device A is intended to be used with the spoiler body 20 connected or consolidated to the diffuser portion 30. A description will be given of a connecting work first.

When connecting, first, as shown in FIGS. 2 and 5, the whole of each lateral end portion of the spoiler body 20 is inserted in the insertion space 35 of the diffuser portion 30. In this case, the vehicle lateral end portion of the vertical wall portion 21 is inserted along the spoiler body 20 in the vertical wall insertion space 35a whereas the mounting flange portion 22 is inserted along the upper edge of the flange insertion space 35b.

Furthermore, the screws 50 inserted through the two fastening holes 22b at the outermost side in the vehicle width direction of the spoiler body 20, are inserted in the screw holes 33a provided at the rear end of the rear connecting flange portion 33 of the diffuser portion 30 for connection. At this time, the fastening of the screw 50 is carried out loosely so that, within the permissible range given by the elongated hole of the fastening holes 22b, the spoiler body 20 and the diffuser portion 30 are held in a relatively movable state in the vehicle width direction.

Subsequently, the spoiler body 20 is positioned to the center portion in the vehicle width direction of the bumper fascia 11, whereas the diffuser portion 30 is positioned with respect to both lateral end portions of the bumper fascia 11 while engaged with the screw 14. The dimension error in the vehicle width direction can be absorbed by adjusting the insertion amount of the spoiler body 20 with respect to the insertion space 35 of the diffuser portion 30. In this way, once positioning of the diffuser portion 30 and the spoiler body 20 has been finished, the screws 50 for connecting the mounting flange portion 22 of the spoiler body 20 and the rear connecting flange portion 33 of the diffuser portion 30 will be completely engaged. At this time, the flange insertion space 35b is ensured with a vertical dimension of the vehicle under the mounting flange portion 22, so that it is easy to perform the fastening operation of the screws.

As described above, in the state of the front spoiler device A being assembled to the front bumper 10, as shown in FIG. 1, the seam B between the spoiler body 20 and the diffuser portion 30 is located in a vehicle front position of the front wheel 40, i.e., formed on lateral ends of the vehicle width direction. Therefore, compared to those arranged in the vehicle widthwise center, the seam is less noticeable and thus the appearance quality may be improved.

Additionally, in the seam B, since the entirety of each lateral end of the spoiler body 20 is inserted into the insertion space 35 without the end faces of both parts 20, 30 being opposed to each other, the seam B does not reflect in the outward appearance as in the case of the conventional dividing line that would be formed by gaps between the end faces. Thus, it is possible to obtain a higher quality of appearance.

It should be noted that dimension errors in manufacturing or mounting position of the bumper fascia 11, the spoiler body 20, and the diffuser portion 30 are absorbed by the amount of insertion of the spoiler body 20 relative to the diffuser portion 30.
(During Travel)

In the front spoiler device A of one or more embodiments of the present invention, on both lateral or widthwise ends of the spoiler body 20, the diffuser portion 30 is provided that extends in the vehicle width direction from the corner portion 13 of the vehicle widthwise ends of the bumper fascia 11 to cover up to the front of the vehicle of the front wheel 40. Therefore, as compared to the conventional structure extending downward from the lower end of the bumper fascia 11, it is possible to improve aerodynamic performance.

Also, since the ribs 34b are formed in the lower part 34a of the connecting portion 34 and rendered in contact with or adjacent to the lateral end portion of the vertical wall portion 21 inserted in the insertion space 35, during vehicle travel, the vertical wall portion 21 will be prevented from being displaced in the longitudinal direction of the vehicle.
(At the Time of Road Surface Interference)

FIG. 7 shows the operation in the front spoiler devices A when the diffuser portion 30 interferes with an obstacle OB such as a curb.

When the obstacle OB collides with the baffle plate portion or straightening vane portion 31, the baffle plate portion 31 will be deformed toward the rear of the vehicle due to the input F0 as indicated by two-dot chain line in the figure.

The input F0 is also transmitted to the rear end of the rear connecting flange portion 33 via the connecting portion 34. Note that the diffuser portion 30 is in the cantilever state supported by the front mounting flange portion 32 extending from the baffle plate portion 31 in the vehicle front direction. In addition, due to a notch or cutout portion 12c above the rear connecting flange portion 33, the spoiler supporting flange portion 12 is not positioned. Therefore, with respect to the diffuser portion 30, the rear connecting flange portion 33 is elastically deformed so as to rotate in the direction of the arrow F1 integrally with the baffle plate portion 31, as shown in FIG. 7.

Thus, the diffuser portion 30 is capable of handling input F0 due to interference with the obstruct OB by the elastic deformation and suppressing damage. Also, since the baffle plate portion 31, the connecting portion 34, and the rear connecting flange portion 33 are formed integrally to form an annular shape or ring, as compared with the arrangement without forming the ring, the rigidity is increased. Thus, it is possible to reduce the damage at the time of interference with the obstacle OB.

Below, technical effects of one or more embodiments of the present invention are listed.

a) A front spoiler device according to one or more embodiments of the present invention comprises:
a bumper fascia 11 forming the outer surface of a front bumper 10;
a spoiler body 20 extending along the lower end of the bumper fascia 11 in the vehicle width direction, the spoiler body being provided with a vertical wall portion 21 facing the front of the vehicle;
a diffuser portion 30 connected to each lateral end of the spoiler body 20 that extends in the vehicle downward direction and in the vehicle width direction along a corner portion of each lateral end on the lower end of the bumper fascia 11; and
an insertion space forming portion 36 provided on the diffuser portion 30 that forms an insertion space into which at least the lateral end of the vertical wall portion 21 is insertable in the vehicle width direction to thereby form an annular shape with the baffle plate portion 31.

Thus, since the front spoiler device A is provided with a diffuser portion 30 that extends in the vehicle downward direction and in the vehicle width direction of the corner portion of the bumper fascia 11, as compared to the structure with a part extending only in the vehicle downward direction of the bumper fascia 11, aerodynamic performance is improved.

In addition, in the state of the front spoiler device A being assembled to the front bumper 10, as shown in FIG. 1, the seam B between the spoiler body 20 and the diffuser portion 30 is formed in the front of and at the vehicle width end portion of the front wheel 40. Therefore, compared to those arranged in the vehicle widthwise center, the seam is less noticeable and thus the appearance quality may be improved.

Additionally, in the seam B, since the entirety of each lateral end of the spoiler body 20 is inserted into the insertion space 35 without the end faces of both parts 20, 30 being opposed to each other, the seam B does not reflect in the outward appearance as in the case of the conventional dividing line that would be formed by gaps between the end faces. Thus, it is possible to obtain a higher quality of appearance.

Thus, in one or more embodiments of the present invention, without deteriorating the outward appearance quality, a front spoiler device A may be provided with excellent aerodynamic characteristics by extending both ends of the lower end of the front bumper 10 in the vehicle width direction.

Further, in the front spoiler device A, since the baffle plate portion 31 and the insertion space forming portion 36 are formed in an annular shape, as compared with a structure without forming the annular shape, the rigidity is increased so that damage upon interference with an obstruct OB will be suppressed.

b) A front spoiler device according to one or more embodiments of the present invention comprises:
a mounting flange portion 22 formed in the spoiler body extended rearward from the upper end of the vertical wall portion 21 and attached to a spoiler supporting flange portion 12 extending rearward from the lower end of the bumper fascia 11;
a rear connecting flange portion 33 formed in the diffuser portion 30 extending from the upper end of the baffle plate portion 31 in the vehicle rearward direction and is mounted to the mounting flange portion 22 with being superimposed on the upper surface of the mounting flange portion 22;
wherein the insertion space 35 is formed in such a manner in which the mounting flange portion 22 is insertable along with the vertical wall portion 21; and
the insertion space forming portion 36 is formed by a connecting portion 34 connecting the baffle plate portion 31 and the rear connecting flange portion 33 and the rear connecting flange portion 33.

As described above, since the diffuser portion 30 is formed in such a manner in which the annular portion forming the insertion space 35 is formed by connecting the baffle plate portion 31 and the rear connecting flange portion 33, the cross sectional area of the insertion space 35 is large, so that, as compared with a case of small sectional area of the insertion space 35, elastic deformation of the annular shape surrounding the insertion space of the vehicle is permitted while improving the rigidity.

Thus, with respect to the diffuser, upon interference with an obstruct OB, the input will be alleviated by absorbing the energy by elastic deformation while suppressing damage.

c) A front spoiler device according to one or more embodiments of the present invention comprises:
screw holes 33a and fastening holes 22b in the mounting flange portion 22 and the rear connecting flange portion 33, respectively, for fastening both portions by screws 50 as a fastening element, wherein the fastening hole 22b is formed in an elongated shape extending in the vehicle width direction so as to allow a relative movement of the two holes 33a, 22b as an adjustment margin of the insertion amount of the spoiler body 20 with respect to the insertion space 35.

Thus, with respect to the spoiler body 20 and the diffuser portion 30, even if the dimensional manufacturing error or installation error on the bumper fascia 11 should occur, this error will be absorbed by adjusting the insertion margin of the spoiler body 20 with respect to the insertion space 35 formed in the diffuser portion 30.

d) A front spoiler device according to one or more embodiments of the present invention comprises:
a front mounting flange portion 32 formed in the diffuser portion 30 that extends in the vehicle front from the upper end of the baffle plate portion 31 and superimposed on the lower surface of the spoiler supporting flange portion 12 to be connected in a cantilever state.

Since the diffuser portion 30 is supported on the front mounting flange portion 32 in a cantilever condition, in comparison with those supported on both of front and rear sides, the elastic deformation is facilitated when interfaced with the obstacle OB to thereby suppressing damage. In particular, when the baffle plate portion 31 interferes with the obstacle OB, since the elastic deformation is likely to occur and the baffle plate portion 31 will rotate in the vehicle rearward about a supporting point or a fulcrum in the front mounting flange portion 32, which would lead to enhancing damage suppression effect.

e) A front spoiler device according to one or more embodiments of the present invention comprises:
a cutout portion 12c formed in the spoiler supporting flange portion 12 for allowing displacement of an overlapping portion between the mounting flange portion 22 and the rear connecting flange portion 33 in the vehicle upward direction.

By providing the cutout portion 12c in the spoiler supporting flange portion 12 of the bumper fascia 11, as described in the d) above, in particular, when the baffle plate portion 31 interferes with the obstacle OB, the baffle plate portion 31 is likely to be elastically deformed so as to rotate toward the rear of the vehicle about the supporting point of the front mounting flange 32 so that damage suppression effect is further enhanced.

In particular, in the structure in which the connecting portion 34 connects the lower end of the baffle plate portion 31 and the rear end of the rear connecting flange portion 33, the input to the baffle plate portion 31 is transmitted to the rear end of the rear connecting flange portion 33 via the connecting portion 34, whereby the input to the baffle plate portion 31 will be effectively transmitted to the rear connecting flange portion 33 so that the input will be distributed and damage is able to be prevented.

Although specific embodiments of a front spoiler device are described above, the invention is not limited to the above embodiments, and design changes and additions are within a scope of the present invention.

For example, shapes of the spoiler body and the diffuser portion, the vertical wall portion, the baffle or rectifier plate portion, and the insertion space forming portion are not limited to those illustrated in the above embodiments.

Figure 8:
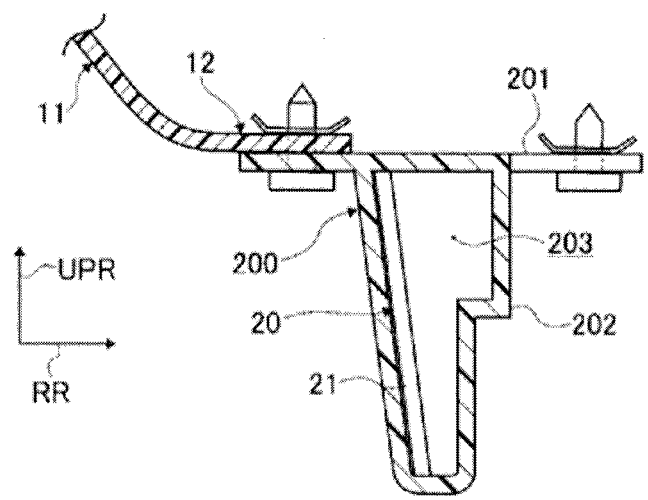
FIG. 8 is a cross-sectional view showing a main part of the front spoiler device of one or more embodiments of the present invention.

Also, in one or more of the above embodiments, with respect to the connecting portion, a structure for connecting the lower end of the baffle plate portion and the rear end of the rear connecting flange portion is shown as the connecting portion. However, the connecting location is not limited to this arrangement. For example, as shown in FIG. 8, such a structure may be adopted in which the connecting portion 202 is connected to an intermediate position of the rear side connecting flange portion 201.

Figure 9:
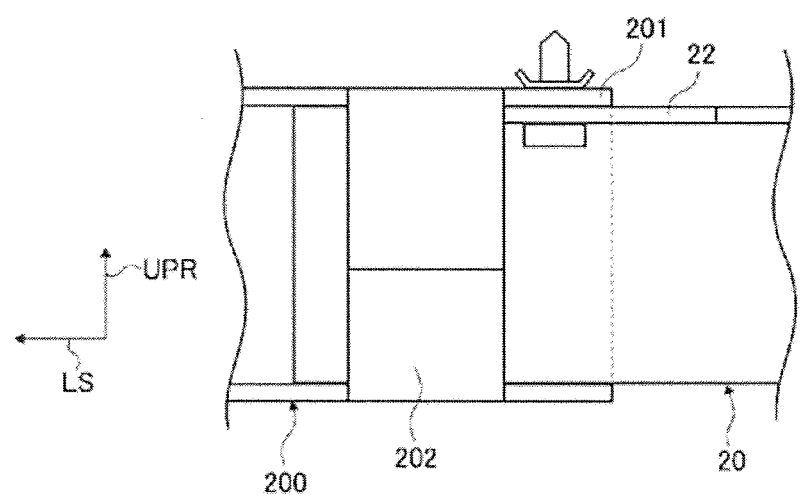
FIG. 9 is a rear view of the front spoiler device seen from the vehicle rear side, showing a main part of the front spoiler device of one or more embodiments of the present invention.

In addition, the insertion space 203 may be configured in a manner in which only the vertical wall portion 21 of the spoiler body 20 is pluggable. In this case, as shown in FIG. 9, the connecting part of the rear side connecting flange portion 201 with the mounting flange portion 22 of the spoiler body 20 is placed on the center side in the vehicle width direction than the position of the connecting portion 202 and may be extended rearward of the connecting position to the connecting portion 202.

Also, in one or more of the above embodiments, as the connecting portion that forms the insertion space forming portion in the diffuser portion, a plate shaped configuration is illustrated. However, the shape of the connecting portion is not limited to a plate shape. It may be formed in other shapes such as cylindrical. In this case, it is possible to use a plurality of connection portions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A front spoiler device configured to be installed on a vehicle having a vehicle width direction, a vehicle upward direction, a vehicle downward direction, a vehicle forward direction, and vehicle rearward direction, comprising:
   a front bumper;
   a bumper fascia that forms an outer surface of the front bumper;
   a spoiler supporting flange portion that extends in the vehicle rearward direction from a lower end of the bumper fascia;
   a spoiler body that extends along the lower end of the bumper fascia in the vehicle width direction, the spoiler body being provided with a vertical wall portion facing the vehicle forward direction;
   two diffuser portions, each of which is connected to each lateral end of the spoiler body, each of which extends in the vehicle downward direction and in the vehicle width direction along a corner portion of each lateral end on the lower end of the bumper fascia, and each of which comprises a baffle plate portion;
   an insertion space forming portion provided in each of the diffuser portions that forms an insertion space into which the each lateral end of the vertical wall portion is insertable in the vehicle width direction to thereby form an annular shape with the baffle plate portion;
   a mounting flange portion formed in the spoiler body that extends in the rearward direction from an upper end of the vertical wall portion and attached to the spoiler supporting flange portion; and
   a rear connecting flange portion formed in each of the diffuser portions that extends from an upper end of the baffle plate portion in the vehicle rearward direction and mounted to the mounting flange portion while being superimposed on an upper surface of the mounting flange portion,
   wherein the insertion space is formed such that the mounting flange portion is insertable along with the vertical wall portion, and
   wherein the insertion space forming portion is formed by the rear connecting flange portion and a connecting portion that connects the baffle plate portion to the rear connecting flange portion.

2. The front spoiler device according to claim 1,
   wherein screw holes and fastening holes are provided in the mounting flange portion and the rear connecting flange portion, respectively, to fasten the mounting flange portion to the rear connecting flange portion via screws, and
   wherein at least one of the holes is formed in an elongated shape extending in the vehicle width direction to allow a relative movement of the two holes as an adjustment margin of the insertion amount of the spoiler body with respect to the insertion space.

3. The front spoiler device according to claim 1, further comprising:
   a front mounting flange portion formed in each of the diffuser portions that extends in the vehicle forward direction from the upper end of the baffle plate and superimposed on the lower surface of the spoiler supporting flange portion to be connected in a cantilever state.

4. The front spoiler device according to claim 3, wherein the spoiler supporting flange portion is formed with a cutout portion for allowing displacement of an overlapping portion between the mounting flange portion and the rear connecting flange portion in the vehicle upward direction.

5. The front spoiler device according to claim 2, further comprising:
   a front mounting flange portion formed in each of the diffuser portions that extends in the vehicle forward direction from the upper end of the baffle plate and superimposed on the lower surface of the spoiler supporting flange portion to be connected in a cantilever state.

* * * * *